United States Patent
Hosoe et al.

(10) Patent No.: US 10,132,411 B2
(45) Date of Patent: Nov. 20, 2018

(54) SLIDING COMPONENT

(71) Applicant: EAGLE INDUSTRY CO., LTD., Minato-ku, Tokyo (JP)

(72) Inventors: Takeshi Hosoe, Tokyo (JP); Hideyuki Inoue, Tokyo (JP); Yuta Negishi, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/547,422

(22) PCT Filed: Feb. 8, 2016

(86) PCT No.: PCT/JP2016/053657
§ 371 (c)(1),
(2) Date: Jul. 28, 2017

(87) PCT Pub. No.: WO2016/129553
PCT Pub. Date: Aug. 18, 2016

(65) Prior Publication Data
US 2018/0017163 A1   Jan. 18, 2018

(30) Foreign Application Priority Data

Feb. 14, 2015   (JP) ................ 2015-027032

(51) Int. Cl.
*F16C 17/04*   (2006.01)
*F16C 33/10*   (2006.01)
(Continued)

(52) U.S. Cl.
CPC ........... *F16J 15/164* (2013.01); *F16C 17/045* (2013.01); *F16C 33/1065* (2013.01); *F16J 15/34* (2013.01);
(Continued)

(58) Field of Classification Search
CPC .... F16C 17/045; F16C 33/10; F16C 33/1065; F16C 2240/40; F16C 2240/54;
(Continued)

(56) References Cited

U.S. PATENT DOCUMENTS 2,577,818 A * 12/1951 Woodside ................ B24B 1/00
                                                          277/440
4,573,690 A *  3/1986 DeHart ................... F16J 15/324
                                                          277/309
(Continued)

FOREIGN PATENT DOCUMENTS

CN   101016949 A   8/2007
CN   200961698 Y  10/2007
(Continued)

OTHER PUBLICATIONS

International Search Report (ISR) dated Apr. 26, 2016, issued for International application No. PCT/JP2016/053657.
(Continued)

*Primary Examiner* — Marcus Charles
(74) *Attorney, Agent, or Firm* — Law Office of Katsuhiro Arai (57) ABSTRACT

A sliding component includes a plurality of dimples 10 disposed on at least one of sliding surfaces of a pair of sliding parts relatively sliding on each other, the plurality of dimples 10 is provided mutually independently of the other dimples, and the plurality of dimples 10 has an area ratio set lower on the low-pressure fluid side of the sliding surface than on the high-pressure fluid side. On the sliding surface, a liquid film on the high-pressure fluid side is thickened by dynamic pressure effect to improve fluid lubricity, and a liquid film on the low-pressure fluid side is thinned to prevent leakage.

11 Claims, 5 Drawing Sheets

(51) Int. Cl.
*F16J 15/16* (2006.01)
*F16J 15/34* (2006.01)

(52) U.S. Cl.
CPC ....... *F16J 15/3412* (2013.01); *F16J 15/3424* (2013.01); *C10N 2240/02* (2013.01); *F16C 17/04* (2013.01); *F16C 2240/44* (2013.01)

(58) Field of Classification Search
CPC .............. F16C 2240/42; F16C 2240/46; F16C 2240/74; F16C 2240/44; F16J 15/164; F16J 15/34; F16J 15/3412; F16J 15/3424; C10N 2240/02
USPC .... 384/13, 26, 129, 284, 291, 293; 277/350, 277/358, 399, 571
See application file for complete search history.

(56) References Cited

U.S. PATENT DOCUMENTS

| | | | | |
|---|---|---|---|---|
| 5,044,642 | A | * | 9/1991 | Vogt ................ F16J 15/324 277/559 |
| 5,447,316 | A | * | 9/1995 | Matsui ............. F16J 15/3412 277/400 |
| 6,341,782 | B1 | | 1/2002 | Etsion |
| 7,255,083 | B2 | * | 8/2007 | Hamada ............. C23C 14/0605 123/193.4 |
| 7,270,482 | B2 | * | 9/2007 | Nanbu ................ F16C 7/06 123/78 E |
| 7,771,821 | B2 | * | 8/2010 | Martin ............... C10M 169/04 428/408 |
| 8,347,683 | B2 | * | 1/2013 | Lu ..................... B24C 1/10 175/371 |
| 2002/0090155 | A1 | * | 7/2002 | Ushijima .............. F02F 1/20 384/293 |
| 2003/0189294 | A1 | * | 10/2003 | Tejima ............. F16J 15/3424 277/399 |
| 2012/0144890 | A1 | * | 6/2012 | Miyasaka ............. C21D 7/06 72/53 |
| 2014/0159314 | A1 | * | 6/2014 | Hosoe .............. F16J 15/3412 277/358 |
| 2014/0167362 | A1 | * | 6/2014 | Hosoe .............. F16J 15/3412 277/400 |
| 2014/0217676 | A1 | * | 8/2014 | Hosoe .............. F16J 15/3412 277/350 |
| 2014/0219588 | A1 | * | 8/2014 | McCulfor ............ F16J 15/16 384/26 |

FOREIGN PATENT DOCUMENTS

| | | | |
|---|---|---|---|
| CN | 101672364 A | 3/2010 | |
| CN | 103470762 A | 12/2013 | |
| EP | 2853786 A4 * | 3/2016 | ........... F16J 15/3424 |
| JP | 1989158853 U | 11/1989 | |
| JP | H11287329 A | 10/1999 | |
| JP | 2000169266 A | 6/2000 | |
| JP | 2000170768 A * | 6/2000 | ........... F16C 33/1075 |
| JP | 2007092962 A * | 4/2007 | .............. F16C 33/62 |
| JP | 2007262977 A * | 10/2007 | ................ F04B 1/16 |
| JP | 2013242047 A | 12/2013 | |
| WO | WO-2013176011 A1 * | 11/2013 | ........... F16J 15/3424 |

OTHER PUBLICATIONS

A First Office Action issued by the State Intellectual Property Office of China dated Mar. 22, 2018 for Chinese counterpart application No. 201680007282.5

* cited by examiner

SLIDING COMPONENT

CROSS-REFERENCE TO RELATED APPLICATIONS

This application is the U.S. National Phase under 35 U.S.C. § 371 of International Application PCT/JP2016/053657, filed Feb. 8, 2016, which claims priority to Japanese Patent Application No. 2015-027032, filed Feb. 14, 2015. The International Application was published under PCT Article 21(2) in a language other than English.

TECHNICAL FIELD

The present invention relates to sliding components suitable for, for example, mechanical seals, bearings, and other sliding units. In particular, the present invention relates to sliding parts such as seal rings or bearings that require friction reduction by interposing fluid between sliding surfaces, and prevention of fluid leakage from the sliding surfaces.

BACKGROUND ART

In order for a mechanical seal, an example of a sliding component, to maintain sealing performance for the long term, it must satisfy both conflicting conditions of "sealing" and "lubrication." In particular, in recent years, for environmental measures or the like, there has been an increasing demand for a further friction reduction to reduce mechanical loss while preventing leakage of sealed fluid. In a technique to reduce friction, various textures are given to sliding surfaces to achieve these. For example, one known texture is the alignment of dimples on a sliding surface.

For example, in the invention described in JP H11-287329 A (hereinafter, referred to as "Patent Document 1"), by forming a large number of dimples of different depths on a sliding surface, load capacity is stabilized because load capacity due to a fluid bearing pressure produced in fluid interposed between the sliding surface and an opposing sliding surface during sliding decreases in some dimples with changes in fluid temperature but increases in other dimples, so that an effect of maintaining constantly good sliding performance regardless of changes in temperature is obtained.

In the invention described in JP 2000-169266 A (hereinafter, referred to as "Patent Document 2"), a sliding surface is formed by evaporating a hard coating on a surface of a substrate material made of a sintered ceramics material, and the sliding surface is configured to have a large number of dimples, so that wear resistance is improved and liquid lubricity by the dimples is improved.

CITATION LIST

Patent Document
  Patent Document 1: JP H11-287329 A
  Patent Document 2: JP 2000-169266 A

SUMMARY OF THE INVENTION

Problem to be Solved by the Invention

However, the invention described in Patent Document 1 focuses on the depths of dimples provided on a sliding surface to maintain constantly good sliding performance regardless of changes in temperature, and does not give consideration to satisfying both conflicting conditions of sealing and lubrication.

The invention described in Patent Document 2 provides dimples on a sliding surface to improve liquid lubricity, but does not give consideration to satisfying both conflicting conditions of sealing and lubrication like Patent Document 1.

Pores (porous material) and dimples (desirably processed depressions) are typically used for the purpose of improving fluid lubricity by dynamic pressure effect. On the other hand, there is a fear that the amount of leakage increases.

When the amount of pores and dimples is reduced to thin a liquid film to reduce leakage, sliding surfaces are more likely to contact to each other and generate friction.

A portion that wears on a sliding surface is particularly on the leaking side (low-pressure fluid side). It is required to thin a liquid film between sliding surfaces for sealing, which at the same time causes poor lubrication on the low-pressure fluid side, and is more likely to cause direct contact.

The present invention has an object of providing a sliding component capable of fulfilling both conflicting conditions of sealing and lubrication by thinning a liquid film on the low-pressure fluid side to prevent leakage while thickening a liquid film by dynamic pressure effect on the high-pressure fluid side to improve fluid lubricity.

Means for Solving Problem

To attain the above object, a sliding component according to a first aspect of the present invention is a sliding component including a plurality of dimples disposed on at least one side of sliding surfaces of a pair of sliding parts relatively sliding on each other, the plurality of dimples being provided mutually independently of the other dimples, the plurality of dimples having an area ratio set lower on a low-pressure fluid side of the sliding surface than on a high-pressure fluid side.

According to this aspect, on the high-pressure fluid side of the sliding surface, fluid lubrication is provided by dynamic pressure effect, and on the low-pressure fluid side, the dimples can hold fluid to prevent a liquid film from running out, to prevent friction due to direct contact while leakage is prevented, so that both sealing and lubrication on the sliding surface can be achieved.

According to a second aspect of the present invention, in the sliding component in the first aspect, the plurality of dimples has different opening diameters, is disposed in a randomly distributed manner, and has a disposition density set lower on the low-pressure fluid side of the sliding surface than on the high-pressure fluid side.

According to this aspect, an improvement in the sliding characteristics, that is, a reduction in the friction coefficient can be achieved in a wide range of bearing characteristic numbers on the sliding surface.

According to a third aspect of the present invention, in the sliding component in the second aspect, the opening diameters of the plurality of dimples are set in a range of 10 to 500 μm.

According to this aspect, the sliding characteristics can be further improved in a wide range of bearing characteristic numbers on the sliding surface.

According to a fourth aspect of the present invention, in the sliding component in the first aspect, the plurality of dimples has an opening diameter set approximately the same, and has a disposition density set lower on the low-pressure fluid side of the sliding surface than on the high-pressure fluid side.

According to this aspect, production is easy.

According to a fifth aspect of the present invention, in the sliding component in any one of the first to fourth aspects, the area ratio of the plurality of dimples is 30 to 50%.

According to this aspect, both sealing and lubrication on the sliding surface can be achieved.

According to a sixth aspect of the present invention, in the sliding component according to any one of the first to fifth aspects, the plurality of dimples has a depth set in a range of 50 to 10000 nm.

According to this aspect, the friction coefficient on the sliding surface can be reduced.

According to a seventh aspect of the present invention, in the sliding component in any one of the first to sixth aspects, the plurality of dimples has a depth set in a range of 50 to 1000 nm.

According to this aspect, the sliding characteristics at extremely low speed on the sliding surface can be made favorable.

Effect of the Invention

The present invention achieves outstanding effects as below.

(1) On the high-pressure fluid side of the sliding surface, fluid lubrication is provided by dynamic pressure effect, and on the low-pressure fluid side, the dimples can hold fluid to prevent the liquid film from running out to prevent friction due to direct contact while leakage is prevented, so that both sealing and lubrication on the sliding surface can be achieved.

(2) The plurality of dimples has different opening diameters, is disposed in a randomly distributed manner, and has a disposition density set lower on the low-pressure fluid side of the sliding surface than on the high-pressure fluid side, so that an improvement in the sliding characteristics, that is, a reduction in the friction coefficient can be achieved in a wide range of bearing characteristic numbers on the sliding surface.

(3) The opening diameters of the plurality of dimples are set in a range of 10 to 500 μm, so that the sliding characteristics can be further improved in a wide range of bearing characteristic numbers on the sliding surface.

(4) The plurality of dimples has an opening diameter set approximately the same, and has a disposition density set lower on the low-pressure fluid side of the sliding surface than on the high-pressure fluid side, so that the sealing component capable of achieving both sealing and lubrication on the sliding surface can be produced easily.

(5) The area ratio of the plurality of dimples is 30 to 50%, so that both sealing and lubrication on the sliding surface can be achieved.

(6) The plurality of dimples has a depth set in a range of 50 to 10000 nm, so that the friction coefficient on the sliding surface can be reduced.

(7) The plurality of dimples has a depth set in a range of 50 to 1000 nm, so that the sliding characteristics at extremely low speed on the sliding surface can be made favorable.

BRIEF DESCRIPTION OF THE DRAWINGS

FIG. 2 is for illustrating an example of a sliding surface of a sliding part according to the first embodiment of the present invention.

DESCRIPTION OF EMBODIMENTS

Hereinafter with reference to the drawings, forms for implementing this invention will be described illustratively based on embodiments. However, the dimensions, materials, shapes, relative arrangements, and the like of components described in the embodiments are not intended to limit the scope of the present invention only to them unless otherwise described explicitly.

First Embodiment

With reference to FIGS. 1 to 4, a sliding component according to a first embodiment of the present invention will be described. In the embodiment below, a mechanical seal, an example of the sliding component, is described as an example, but is not limiting. For example, the sliding component can be used as a bearing sliding component that slides on a rotating shaft while sealing lubricating oil on axially one side of a cylindrical sliding surface.

The outer peripheral side of the sliding component constituting the mechanical seal is described as the high-pressure fluid side (sealed fluid side), and the inner peripheral side as the low-pressure fluid side (atmosphere side), but the present invention is not limited to this, and is applicable to the case where the high-pressure fluid side and the low-pressure fluid side are reversed.

Figure 1:
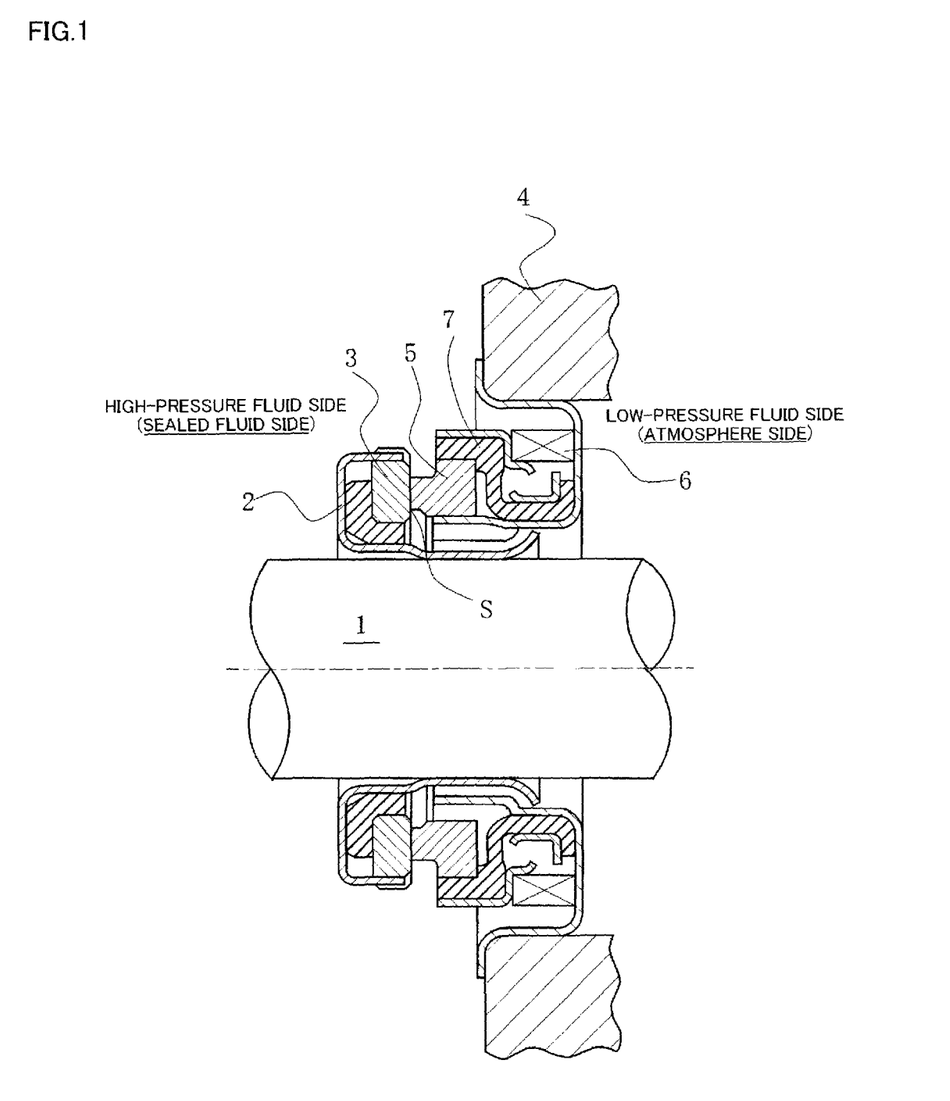
FIG. 1 is a vertical cross-sectional view showing an example of a mechanical seal according to a first embodiment of the present invention.

FIG. 1 is a vertical cross-sectional view showing an example of the mechanical seal, which is an inside mechanical seal in a form of sealing sealed fluid on the high-pressure fluid side heading from the outer periphery of sliding surfaces toward the inner periphery to leak. The mechanical seal is provided, on the side of a rotating shaft 1 to drive a pump impeller (not shown) on the high-pressure fluid side, with an annular rotating-side seal ring 3, one sliding part, provided in a state of being integrally rotatable with the rotating shaft 1 via a sleeve 2, and at a pump housing 4, with an annular stationary-side seal ring 5, the other sliding part, provided in a state of being non-rotatable and axially movable. By a coiled wave spring 6 and a bellows 7 axially urging the stationary-side seal ring 5, the rotating-side seal ring 3 and the stationary-side seal ring 5 slide in close contact with each other on sliding surfaces S mirror-finished by lapping or the like. That is, the mechanical seal prevents the sealed fluid from flowing out from the outer periphery of the rotating shaft 1 to the atmosphere side at the sliding surfaces S between the rotating-side seal ring 3 and the stationary-side seal ring 5.

FIG. 1 shows a case where the width of the sliding surface of the rotating-side seal ring 3 is larger than the width of the sliding surface of the stationary-side seal ring 5, which is not limiting. The present invention can be applied to the opposite case as a matter of course.

The material of the rotating-side seal ring 3 and the stationary-side seal ring 5 is selected from silicon carbide (SiC) excellent in wear resistance, carbon excellent in self-lubricity, and the like. For example, both of them may be SiC, or a combination in which the rotating-side seal ring 3 is SiC and the stationary-side seal ring 5 is carbon is possible.

As shown in FIG. 2, dimples 10 are arranged on a sliding surface of at least one of the rotating-side seal ring 3 and the stationary-side seal ring 5 that slide relatively.

In this embodiment, a plurality of dimples 10 is arranged on a sliding surface S of the stationary-side seal ring 5. In this case, the rotating-side seal ring 3 need not be provided with dimples, or may be provided with dimples.

Figure 2A:
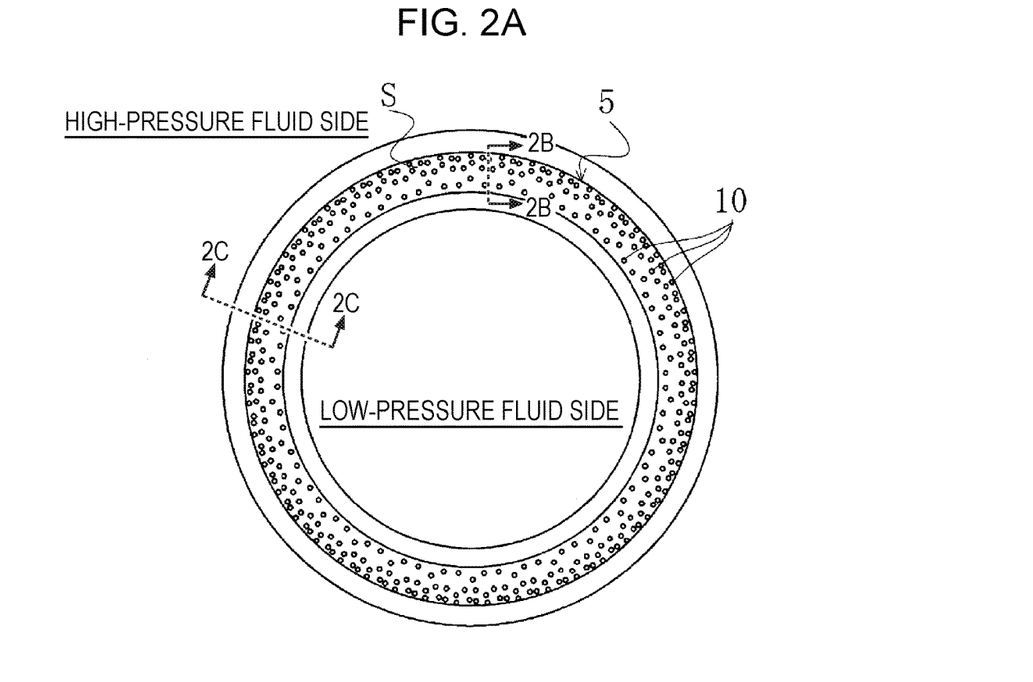
FIG.2A is a plan view of the sliding surface.
Figure 2B:
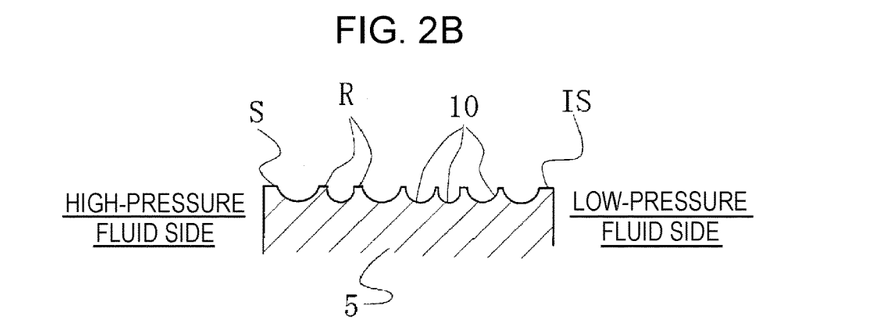
FIG.2B is a cross-sectional view along 2B-2B.
Figure 2C:
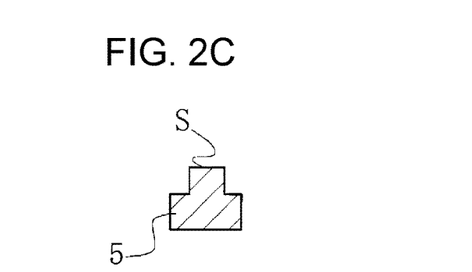
FIG.2C is a cross-sectional view along 2C-2C.

In FIG. 2, the cross-sectional shape of the sliding part is a protruded shape as shown in FIG. 2C, and its top surface constitutes a flat sliding surface S. On the sliding surface S, a large number of dimples 10 as shown in FIG. 2B are independently provided. These dimples 10 are provided not across the entire radial width of the sliding surface S but on a portion except a low-pressure fluid side sealing face IS formed such that a flat land portion R of a fixed width is left circumferentially on the low-pressure fluid side. On the high-pressure fluid side of the sliding surface S, the dimples 10 may be provided to the rim.

In the present invention, "dimples" are depressions formed on the flat sliding surface S, and are not limited to a particular shape. For example, the planar shape of the depressions includes various shapes such as a circle, an ellipse, an oval, and a polygon, and the cross-sectional shape of the depressions includes various shapes such as a bowl shape and a square shape.

The large number of dimples 10 formed on the sliding surface S have the function of holding part of liquid interposed as a hydrodynamic lubricating liquid film between the sliding surface S and an opposing sliding surface relatively sealing on the sliding surface S, to stabilize the lubricating liquid film.

Figure 3:
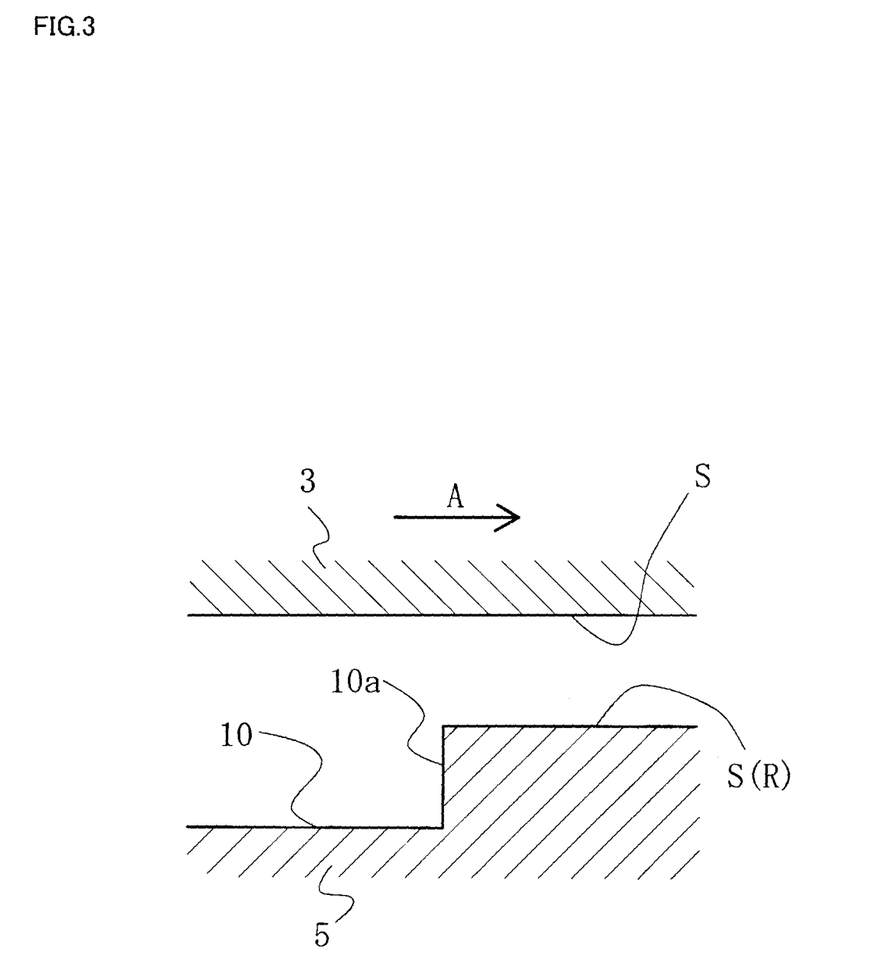
FIG. 3 is an explanatory view illustrating the function of a dimple.

Each of the dimples 10 can be regarded as constituting a Rayleigh step as shown in FIG. 3.

In FIG. 3, a Rayleigh step 10a extending in a direction orthogonal to the cross section of the figure is formed on the sliding surface S(R) of the stationary-side seal ring 5. The sliding surface S of the rotating-side seal ring 3 is formed in a flat shape. When the rotating-side seal ring 3 relatively moves in a direction shown by an arrow, fluid interposed between the sliding surfaces moves following the arrow direction due to its viscosity. At that time, the presence of the Rayleigh step 10a generates dynamic pressure (positive pressure). The generation of the dynamic pressure increases the lubricating liquid film between the sliding surfaces, thus improving the lubrication performance. While the lubrication performance is improved by dynamic pressure effect, there is a possibility that the amount of leakage increases. When the amount of dimples is reduced to thin the lubricating liquid film to reduce the amount of leakage, the sliding surfaces S are more likely to contact to each other and generate friction.

Figure 4:
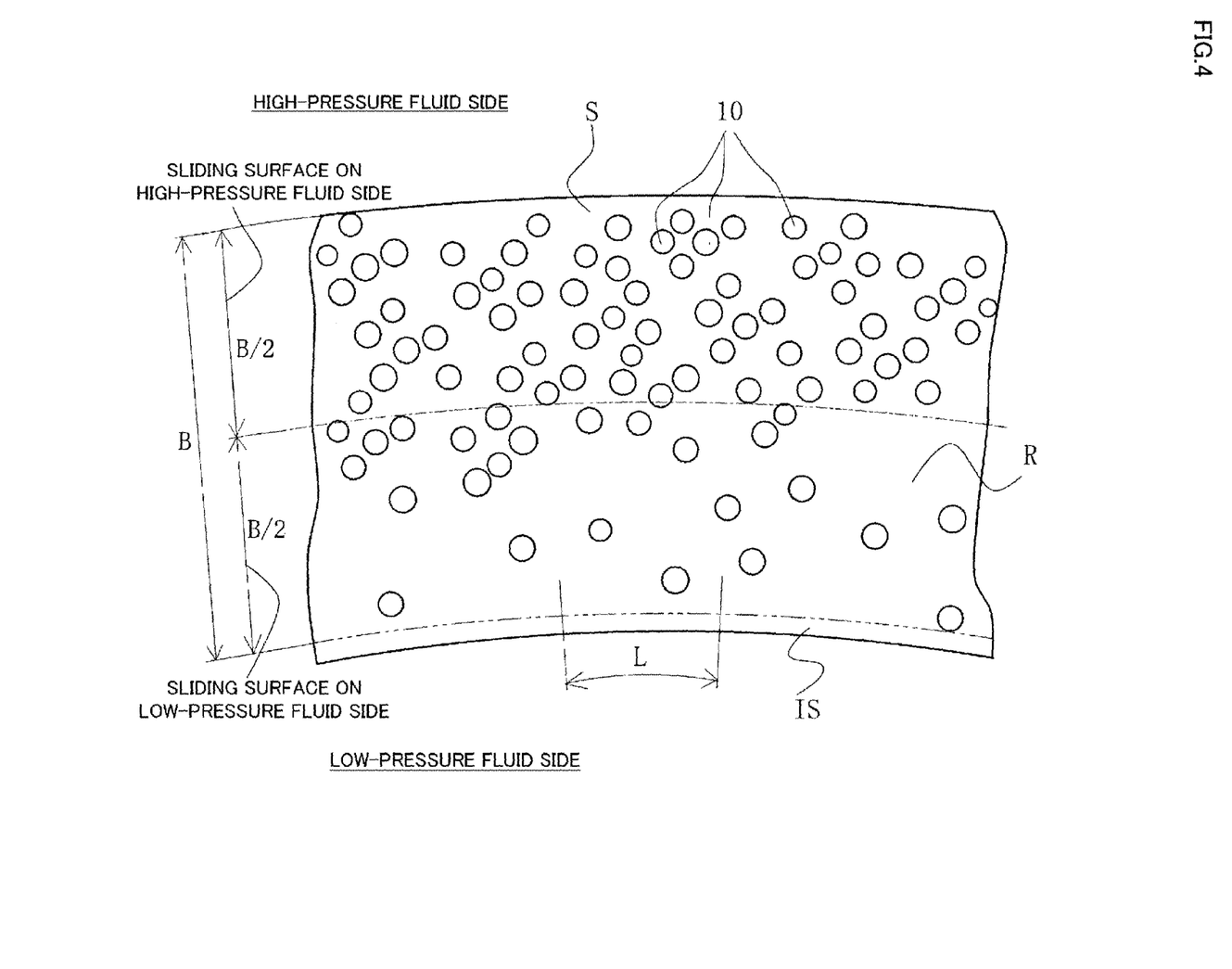
FIG. 4 is a plan view of an enlarged portion of the sliding surface of the sliding part according to the first embodiment of the present invention.

FIG. 4 is a plan view of an enlarged portion of the sliding surface S, showing the state where the plurality of dimples 10 is disposed randomly on a part of the sliding surface except the low-pressure fluid side sealing face IS, and the area ratio of the plurality of dimples 10 is set lower on the low-pressure fluid side of the sliding surface S than on the high-pressure fluid side.

Here, "the area ratio of the plurality of dimples" is the sum of the opening areas of the dimples in the area of the part of the sliding surface S on which the dimples are provided.

"The area ratio is set lower on the low-pressure fluid side of the sliding surface S than on the high-pressure fluid side" means that the area ratio in a unit circumferential length L is set lower on the low-pressure fluid side than on the high-pressure fluid side on all circumferential portions of the sliding surface S.

In a radial direction of the sliding surface S, the area ratio may be changed continuously, or may be changed discontinuously.

"The high-pressure fluid side" and "the low-pressure fluid side" express radial sides of the sliding surface S. The division between a sliding surface on the high-pressure fluid side and a sliding surface on the low-pressure fluid side is made with a point of B/2, a midpoint of B, as a guide, where B is the width of a portion except the radial width of the low-pressure fluid side sealing face IS.

The sizes (e.g. diameters) of the individual dimples 10 may be all the same, may be all different, or may be partly the same and partly different. It is essential only that the area ratio of the plurality of dimples 10 is set lower on the low-pressure fluid side of the sliding surface S than on the high-pressure fluid side.

In FIG. 4, the low-pressure fluid side sealing face IS formed such that a flat land portion R of a fixed width is left circumferentially on the low-pressure fluid side is provided, the plurality of dimples 10 of different opening diameters is disposed mutually independently of the other dimples in a randomly distributed manner on a portion of the sliding surface except the low-pressure fluid side sealing face IS, and the area ratio of the plurality of dimples 10 is set lower on the low-pressure fluid side of the sliding surface S than on the high-pressure fluid side.

The area ratio of the plurality of dimples 10 is preferably set at 30 to 50% to achieve both sealing and lubrication.

An example of a method of processing dimples on a sliding surface is described as follows.

(1) Determine the diameters and the positions of holes to be made in a metal mask, using random numbers.

(2) Make holes in the metal mask by laser machining or the like with the determined diameters and positions.

(3) Place the metal mask in which the holes have been made randomly on a sliding surface of an object sliding part.

(4) Form dimples on the sliding surface by emitting a femtosecond laser beam or a picosecond laser beam from above the metal mask, or ion etching or the like using the holes of the metal mask. Dimples of different opening diameters are disposed uniformly in a predetermined distribution on the sliding surface.

The random distribution of the plurality of dimples 10 of different opening diameters is set according to a bearing characteristic number G (fluid viscosity×velocity/load) of the sliding surface or the like. In this embodiment, the opening diameters are set to be distributed preferably in a range of 10 to 500 µm, and more preferably 30 to 100 µm. Thus, the fluid lubrication transition point is shifted to the lower G side, and the friction coefficient at the fluid lubrication transition point is lowered, and further, the friction coefficient reduced in a wide range of rotation speed area.

The depth of the plurality of dimples 10 is preferably set in a range of 50 to 10000 nm from the aspect of friction coefficient reduction, for example. When importance is attached to sliding characteristics at extremely low speed, the depth is preferably set in a range of 50 to 1000 nm, and more preferably 50 to 500 nm.

The sliding component in the first embodiment achieves effects as below.

(1) The area ratio of the plurality of dimples 10 is set lower on the low-pressure fluid side of the sliding surface S than on the high-pressure fluid side, so that on the high-pressure fluid side of the sliding surface S, fluid lubrication is provided by dynamic pressure effect, and on the low-pressure fluid side, the dimples 10 can hold fluid to prevent a liquid film from running out to prevent friction due to direct contact while leakage is prevented, so that both sealing and lubrication on the sliding surface can be achieved.

(2) The plurality of dimples 10 of different opening diameters is disposed in a randomly distributed manner, and the disposition density is set lower on the low-pressure fluid side of the sliding surface S than on the high-pressure fluid side, so that an improvement in the sliding characteristics, that is, a reduction in the friction coefficient can be achieved in a wide range of bearing characteristic numbers G on the sliding surface.

(3) The area ratio of the plurality of dimples 10 is 30 to 50%, so that both sealing and lubrication on the sliding surface S can be achieved.

(4) The opening diameters of the plurality of dimples 10 are set preferably in a range of 10 to 500 μm, and more preferably 30 to 100 μm, so that the fluid lubrication transition point is shifted to the lower G side, and the friction coefficient at the fluid lubrication transition point is lowered, and further the friction coefficient can be reduced in a wide range of rotation speed area.

(5) The depth of the plurality of dimples 10 is set in a range of 50 to 10000 nm, so that the friction coefficient on the sliding surface S can be reduced.

(6) The depth of the plurality of dimples 10 is set preferably in a range of 50 to 1000 nm, and more preferably 50 to 500 nm, so that the sliding characteristics at extremely low speed on the sliding surface can be made favorable.

Second Embodiment

Figure 5:
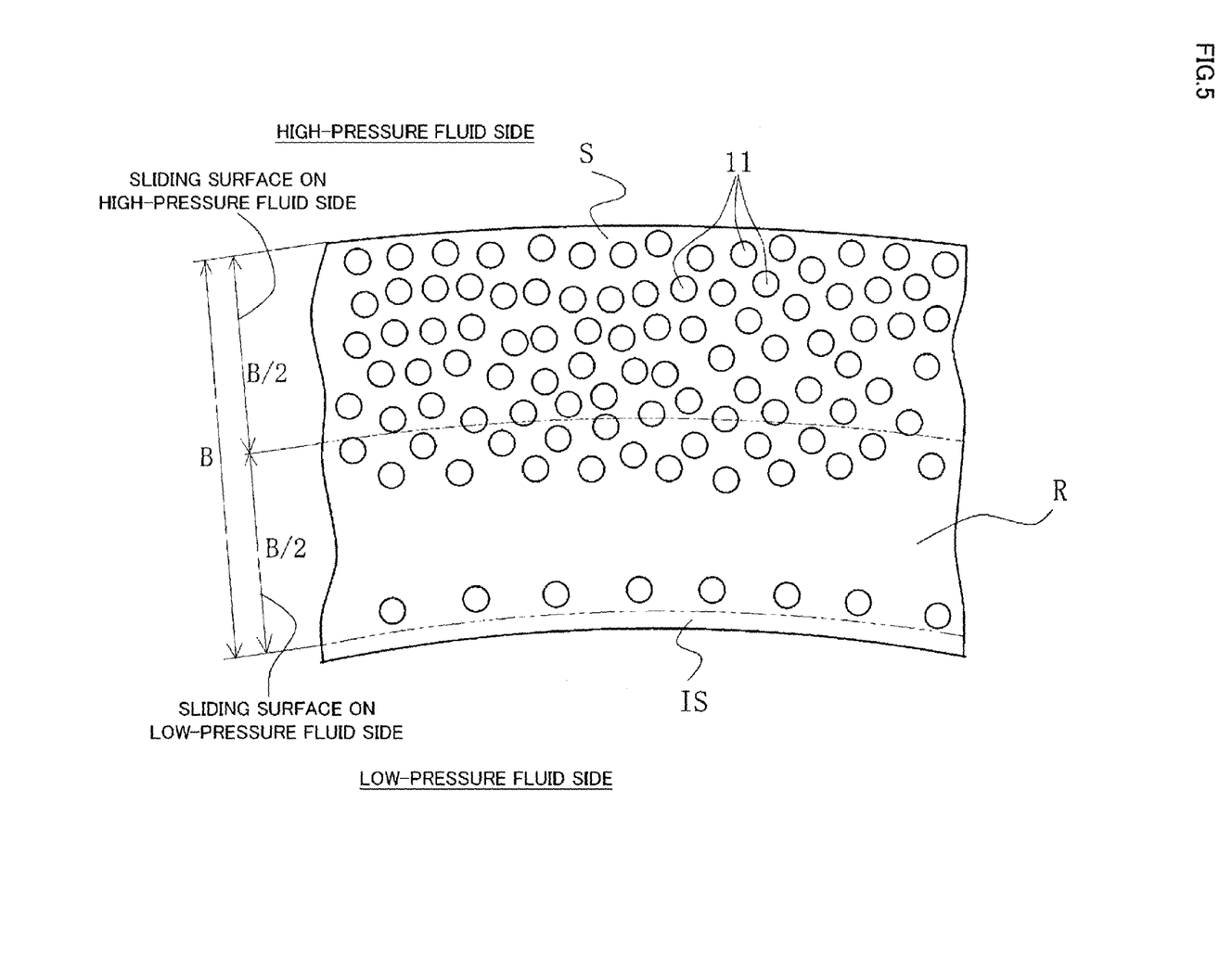
FIG. 5 is a plan view of an enlarged portion of a sliding surface of a sliding part according to a second embodiment of the present invention.

With reference to FIG. 5, a sliding component according to a second embodiment of the present invention will be described.

The second embodiment is different from the first embodiment in that the opening diameter of a plurality of dimples is set approximately the same, but the other configuration is the same as that in the first embodiment. Redundant descriptions will be omitted.

In the second embodiment shown in FIG. 5, the opening diameter of a plurality of dimples 11 is set approximately the same, and its disposition density is set lower on the low-pressure fluid side of a sliding surface S than on the high-pressure fluid side.

The disposition form of the plurality of dimples 11 may be a random distribution, or may be a regular distribution.

In FIG. 5, dimples 11 provided in the vicinity of the outer peripheral side of a low-pressure fluid side sealing face IS formed such that a flat land portion R of a fixed width is left circumferentially on the low-pressure fluid side are disposed circumferentially at regular intervals. Dimples 11 on the other portion are distributed randomly. There is a portion on which dimples 11 are not provided in a radial middle portion on a sliding surface on the low-pressure fluid side.

The sliding component according to the second embodiment achieves the same effects as the first embodiment, and additionally, is easy to produce since the opening diameter of the plurality of dimples 11 is set approximately the same.

Although the embodiments of the present invention have been described above with reference to the drawings, its specific configuration is not limited to these embodiments. Any change and addition made without departing from the scope of the present invention are included in the present invention.

For example, although the embodiments have been described on the example where the sliding part is used as one of a pair of a rotating seal ring and a stationary seal ring in a mechanical seal device, it can also be used as a bearing sliding part that slides on a rotating shaft while sealing lubricating oil on axially one side of a cylindrical sliding surface.

Further, for example, although the embodiments have been described on the case where high-pressure sealed fluid is present on the outer peripheral side, the sliding component can be used when high-pressure fluid is on the inner peripheral side.

Further, for example, although the first embodiment has been described on the case where a plurality of dimples of different opening diameters is distributed randomly, and the second embodiment on the case where a plurality of dimples of approximately the same opening diameter is disposed randomly and regularly, these illustrate preferable examples, and are not limiting. For example, a plurality of dimples sequentially reduced in opening diameter from the high-pressure fluid side toward the low-pressure fluid side may be regularly disposed.

REFERENCE SIGN LIST

1 Rotating shaft
2 Sleeve
3 Rotating ring
4 Housing
5 Stationary ring
6 Coiled wave spring
7 Bellows
10 Dimple
11 Dimple
S Sliding surface
R Land portion
IS Low-pressure fluid side sealing face

The invention claimed is:

1. A sliding component comprising:
a plurality of dimples disposed on at least one of sliding surfaces of a pair of sliding parts relatively sliding on each other, the plurality of dimples being provided mutually independently of each other, the plurality of dimples having an area ratio set lower on a low-pressure fluid side of the sliding surface than on a high-pressure fluid side,
wherein the plurality of dimples has a predetermined opening diameter distribution, is disposed in a randomly distributed manner, and has a disposition density set lower on the low-pressure fluid side of the sliding surface than on the high-pressure fluid side.

2. The sliding component according to claim 1, wherein the opening diameters of the plurality of dimples are distributed in a range of 10 to 500 μm.

3. The sliding component according to claim 2, wherein the area ratio of the plurality of dimples is 30 to 50%.

4. The sliding component according to claim 2, wherein the Plurality of dimples has a depth set in a range of 50 to 10000 nm.

5. The sliding component according to claim 1, wherein the area ratio of the plurality of dimples is 30 to 50%.

6. The sliding component according to claim 5, wherein the plurality of dimples has a depth set in a range of 50 to 10000 nm.

7. The sliding component according to claim 5, wherein the plurality of dimples has a depth set in a range of 50 to 1000 nm.

8. The sliding component according to claim 1, wherein the plurality of dimples has a depth set in a range of 50 to 10000 nm.

9. A sliding component comprising:
   a plurality of dimples disposed on at least one of sliding surfaces of a pair of sliding parts relatively sliding on each other, the plurality of dimples being provided mutually independently of each other, the plurality of dimples having an area ratio set lower on a low-pressure fluid side of the sliding surface than on a high-pressure fluid side,
   wherein the plurality of dimples has an opening diameter set approximately the same, and has a disposition density set lower on the low-pressure fluid side of the sliding surface than on the high-pressure fluid side.

10. The sliding component according to claim 9, wherein the area ratio of the plurality of dimples is 30 to 50%.

11. The sliding component according to claim 9, wherein the plurality of dimples has a depth set in a range of 50 to 10000 nm.

\* \* \* \* \*